(12) United States Patent
Kloeppner

(10) Patent No.: US 11,624,962 B2
(45) Date of Patent: Apr. 11, 2023

(54) ELECTRO-OPTIC ELEMENTS AND METHOD OF FORMING

(71) Applicant: Gentex Corporation, Zeeland, MI (US)

(72) Inventor: Leroy J. Kloeppner, Jenison, MI (US)

(73) Assignee: GENTEX CORPORATION, Zeeland, MI (US)

( * ) Notice: Subject to any disclaimer, the term of this patent is extended or adjusted under 35 U.S.C. 154(b) by 213 days.

(21) Appl. No.: 17/036,260

(22) Filed: Sep. 29, 2020

(65) Prior Publication Data

US 2021/0103194 A1 Apr. 8, 2021

Related U.S. Application Data

(60) Provisional application No. 62/909,379, filed on Oct. 2, 2019.

(51) Int. Cl.

| | |
|---|---|
| *G02F 1/153* | (2006.01) |
| *G02F 1/161* | (2006.01) |
| *G02F 1/1503* | (2019.01) |
| *G02F 1/1516* | (2019.01) |
| *G02F 1/1524* | (2019.01) |
| *G02F 1/15* | (2019.01) |

(52) U.S. Cl.
CPC ............ *G02F 1/1533* (2013.01); *G02F 1/161* (2013.01); *G02F 1/1503* (2019.01); *G02F 1/1524* (2019.01); *G02F 1/15165* (2019.01); *G02F 2001/1518* (2019.01); *G02F 2001/164* (2019.01); *G02F 2201/44* (2013.01)

(58) Field of Classification Search
CPC ...... G02F 1/1533; G02F 1/161; G02F 1/1503; G02F 1/15165; G02F 1/1524; G02F 2001/1518; G02F 2001/164; G02F 2201/44

See application file for complete search history.

(56) References Cited

U.S. PATENT DOCUMENTS

| | | |
|---|---|---|
| 4,902,108 A | 2/1990 | Byker |
| 5,928,572 A | 7/1999 | Tonar et al. |
| 5,940,201 A | 8/1999 | Ash et al. |

(Continued)

FOREIGN PATENT DOCUMENTS

| | | | | |
|---|---|---|---|---|
| JP | 57011325 B2 * | 1/1982 | ......... | G02F 1/15165 |
| WO | 2019178540 A1 | 9/2019 | | |

*Primary Examiner* — George G. King
(74) *Attorney, Agent, or Firm* — Price Heneveld LLP; Brian James Brewer

(57) ABSTRACT

An electro-optic element includes a first electroactive compartment including an electroactive film having a first electroactive component and a second electroactive compartment including an electroactive solution or gel having a second electroactive component. An ion selective material is disposed between the first and second electroactive compartments and is configured to inhibit diffusion of the second electroactive component in an activated state from the second electroactive compartment to the first electroactive compartment. At least one of the first and second electroactive components is electrochromic such that the electro-optic element is configured to reversibly attenuate transmittance of light having a wavelength within a predetermined wavelength range when an electrical potential is applied to the electro-optic element.

18 Claims, 3 Drawing Sheets

(56) References Cited

U.S. PATENT DOCUMENTS

| | | |
|---|---|---|
| 5,998,617 A | 12/1999 | Srinivasa et al. |
| 6,188,505 B1 | 2/2001 | Lomprey et al. |
| 6,635,194 B2 | 10/2003 | Kloeppner et al. |
| 6,710,906 B2 | 3/2004 | Guarr et al. |
| 8,284,472 B2 | 10/2012 | Yoshimura et al. |
| 9,964,828 B2 | 5/2018 | Theiste et al. |
| 2003/0174377 A1 | 9/2003 | Reynolds et al. |
| 2019/0048159 A1 | 2/2019 | Emo et al. |
| 2019/0145161 A1* | 5/2019 | Agrawal .................. E06B 9/24 359/275 |

\* cited by examiner

ELECTRO-OPTIC ELEMENTS AND METHOD OF FORMING

CROSS-REFERENCE TO RELATED APPLICATION

This application claims priority to and the benefit under 35 U.S.C. § 119(e) of U.S. Provisional Application No. 62/909,379, filed on Oct. 2, 2019, entitled "ELECTRO-OPTIC ELEMENTS AND METHOD OF FORMING," the disclosure of which is hereby incorporated herein by reference in its entirety.

FIELD OF THE DISCLOSURE

The present disclosure generally relates to an electro-optic element including an electroactive film separated from an electroactive solution or gel by an ion selective material.

SUMMARY OF THE DISCLOSURE

According to one aspect of the present disclosure, an electro-optic element includes a first electroactive compartment including an electroactive film having a first electroactive component, wherein the first electroactive compartment is disposed adjacent a first electrically conductive layer. A second electroactive compartment disposed adjacent a second electrically conductive layer and including an electroactive solution or gel having a second electroactive component, and wherein the second electroactive component is changeable from an inactivated state to an activated state upon application of a predetermined electrical potential across the first and second electrically conductive layers. An ion selective material is disposed between the first and second electroactive compartments and is configured to inhibit diffusion of the second electroactive component from the second electroactive compartment to the first electroactive compartment. At least one of the first electroactive component and second electroactive component is electrochromic such that the electro-optic element is configured to reversibly attenuate transmittance of light having a wavelength within a predetermined wavelength range when an electrical potential is applied across the first and second electrically conductive layers.

According to one aspect of the present disclosure, a method of forming an electro-optic element is provided. The method includes providing a first electroactive compartment including an electroactive film having a first electroactive component disposed adjacent a first electrically conductive layer, wherein the first electrically conductive layer is disposed on a first substrate. An ion selective material is disposed on the electroactive film. A second substrate is coupled with the first substrate to form a chamber therebetween, wherein the second substrate includes a second electrically conductive layer, and wherein the first and second electrically conductive layers are at least partially disposed within the chamber. An electroactive solution or gel is provided within the chamber to form a second electroactive compartment, wherein the electroactive solution or gel includes a second electroactive component, and wherein the second electroactive component is changeable from an inactivated state to an activated state upon application of a predetermined electrical potential across the first and second electrically conductive layers. The ion selective material is configured to inhibit diffusion of the second electroactive component in the activated state from the second electroactive compartment to the first electroactive compartment while in the active, darkened state. At least one of the first electroactive component and second electroactive component is electrochromic such that the electro-optic element is configured to reversibly attenuate transmittance of light having a wavelength within a predetermined wavelength range when an electrical potential is applied across the first and second electrically conductive layers.

These and other features, advantages, and objects of the present disclosure will be further understood and appreciated by those skilled in the art by reference to the following specification, claims, and appended drawings.

BRIEF DESCRIPTION OF THE DRAWINGS

The present disclosure will become more fully understood from the detailed description and the accompanying drawings, wherein.

DETAILED DESCRIPTION

Figure 1:
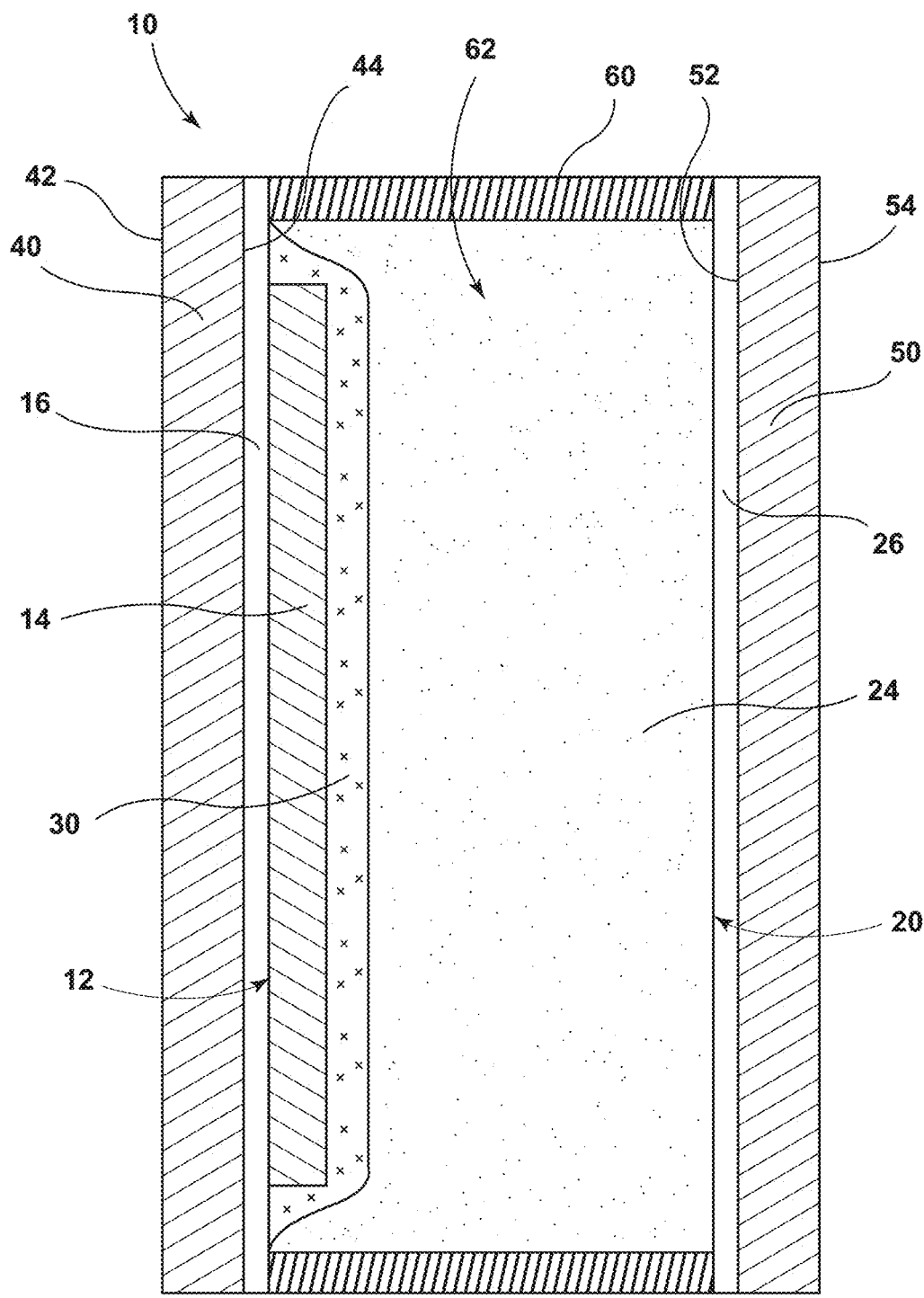
FIG. 1 is a cross-sectional view of a schematic of an electro-optic element according to an aspect of the present disclosure.

The present illustrated aspects reside primarily in combinations of method steps and apparatus components relating to an electro-optic element that includes an electroactive film separated from an electroactive solution or gel by an ion selective material, in which at least one of the electroactive film and the electroactive solution or gel includes an electrochromic component. Such an electro-optic element can be utilized in a variety of electro-optic devices. Accordingly, the apparatus components and method steps have been represented, where appropriate, by conventional symbols in the drawings, showing only those specific details that are pertinent to understanding the aspects of the present disclosure so as not to obscure the disclosure with details that will be readily apparent to those of ordinary skill in the art having the benefit of the description herein. Further, like numerals in the description and drawings represent like elements.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

Generally speaking, electrochromic devices include an electro-optic element that is capable of transitioning between an inactivated, transparent state (in which light is transmitted through the electro-optic element) and an activated, darkened state (in which at least a portion of the light is not transmitted through the electro-optic element), when a sufficient electrical potential is applied. A conventional electrochromic device can include an electro-optic element having an electrochromic material that includes at least one electrochromic and electroactive component that exhibits a change in its extinction coefficient at one or more wavelengths upon exposure to a particular electrical potential difference, i.e., the component absorbs light and provides the electro-optic element with a "colored" or "darkened" appearance. For example, the electrochromic material can darken due to the oxidation of an electrochromic anodic component and/or the reduction of an electrochromic cathodic component of the electrochromic device. Following the removal of the electrical potential, the oxidized anodic component and/or the reduced cathodic component will return to an inactivated state, which results in the electrochromic material returning to a transparent state (also referred to as "clear"). The application and removal of an electrical potential is conventionally referred to as a single cycle of an electrochromic device.

In a conventional solution-based electro-optic element of an electrochromic device, an electrical potential must be constantly applied to the device in order to maintain the device in the activated, colored state; once the electrical potential is removed, the device will transition back to its inactivated, clear state. This phenomenon is often referred to as "self-erasing." However, in some device applications it may be desirable for the electrochromic device to be capable of remaining in an activated, colored state for a certain period of time without having to constantly apply an electrical potential. A device that is capable of remaining in an activated, colored state for a certain period of time without the constant application of an electrical potential can be referred to as bi-stable or as having memory. The ability of an electrochromic device to remain in an activated, colored state, i.e. the ability to have memory and not self-erase, in an open circuit can result in less power consumption by the device over time.

Figure 2:
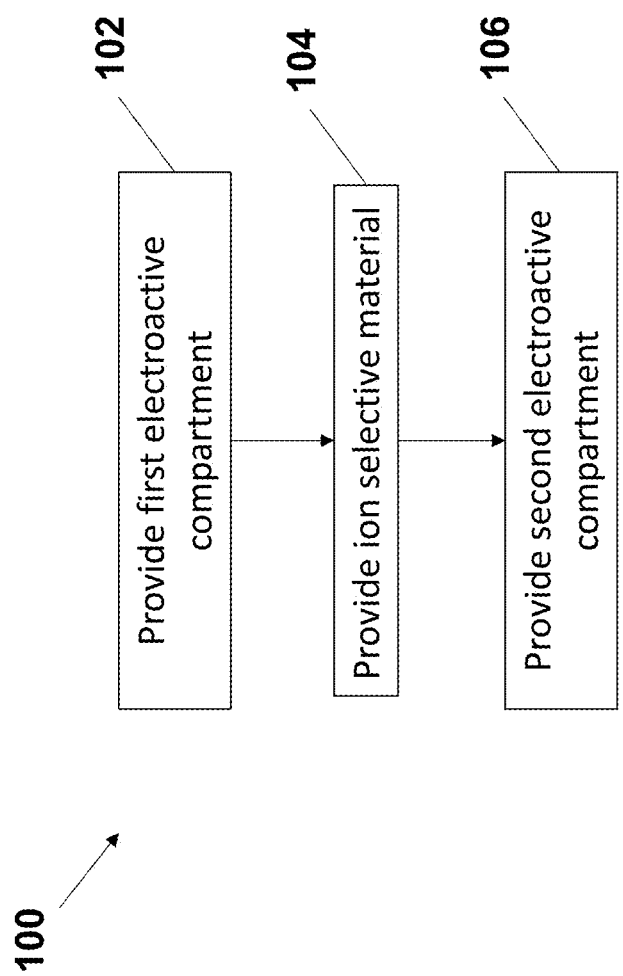
FIG. 2 is a flow chart illustrating a method of forming an electro-optic element according to an aspect of the present disclosure.

Referring to FIGS. 1-2, aspects of the present disclosure relate to electro-optic elements and methods of forming electro-optics that include an electroactive film separated from an electroactive solution or gel by an ion selective material, in which the electroactive film and/or the electroactive solution or gel includes an electrochromic component, and which is bi-stable and has memory, i.e., remains in an activated, colored state for a predetermined period of time in an open circuit. Still referring to FIG. 1, aspects of the present disclosure relate to an electro-optic element 10 that includes a first electroactive compartment 12 that includes an electroactive film 14 including a first electroactive component. The first electroactive compartment 12 can be disposed adjacent a first electrically conductive layer 16. A second electroactive compartment 20 including an electroactive solution or gel 24 including a second electroactive component can be disposed adjacent a second electrically conductive layer 26. An ion selective material 30 is disposed between the first electroactive compartment 12 and the second electroactive compartment 20 and is configured to inhibit diffusion of the second electroactive component from the second electroactive compartment 20 to the first electroactive compartment 12, when in an activated state. The ion selective material 30 can be configured to inhibit diffusion of the second electroactive component from the second electroactive compartment 20 to the first electroactive compartment 12, while allowing little or no electron conductivity through the ion selective material 30 and between the first and second electroactive compartments 12, 20. At least one of the first electroactive component and the second electroactive component is electrochromic such that the electro-optic element 10 is configured to reversibly attenuate transmittance of light having a wavelength within a predetermined wavelength range when an electrical potential is applied across the first and second electrically conductive layers 16, 26. It will be understood that regardless of its ordinary meaning, unless otherwise specified, the term "light" is used herein to mean any wavelength or predetermined wavelength range that includes portions of the visible, near-infrared and/or infrared regions of the electromagnetic spectrum. The first electroactive component can be a cathodic component or an anodic component and the second electroactive component can be the other of a cathodic component and an anodic component.

It will be understood that the anodic and cathodic components may alternatively be referred to as chromophores or electrochromic molecules. Typically, both of the anodic and cathodic components are electroactive and at least one of them is electrochromic. It will be understood that regardless of its ordinary meaning, the term "electroactive" may mean a component that undergoes a modification in its oxidation state upon exposure to a particular electrical potential difference. Additionally, it will be understood that the term "electrochromic" may mean, regardless of its ordinary meaning, a component that exhibits a change in its extinction coefficient at one or more wavelengths upon exposure to a particular electrical potential difference. Electrochromic components, as described herein, include materials whose color or opacity are affected by an electrical current, such that when an electrical potential is applied to the material, the color or opacity changes from a first state to a second state.

Still referring to FIG. 1, the electro-optic element 10 includes a first substrate 40 having a front or first surface 42 and a second surface 44. The first surface 42 can be a viewer side of the electro-optic element 10. For example, when the electro-optic element 10 is incorporated into a mirror assembly, the first surface 42 can be considered the viewer facing side. The first electrically conductive layer 16 can be disposed on the second surface 44. The electro-optic element 10 also includes a second substrate 50. The second substrate 50 includes a third surface 52 and a fourth surface 54. According to one aspect, one of the first and second substrates 40, 50 may be larger than the other or offset from one another along at least a portion of a perimeter of the electro-optic element 10. The second electrically conductive layer 26 can be disposed on the third surface 52 of the second substrate 50. While aspects of the present disclosure are described in the context of the first electroactive compartment 12 being disposed adjacent to the first substrate 40 and the second electroactive compartment 20 being disposed adjacent to the second substrate 50, it is within the scope of the present disclosure for the first electroactive compartment 12 to be disposed adjacent to the second substrate 50 and the second electroactive compartment 20 to be disposed adjacent to the first substrate 40.

The ion selective material 30 is provided between the first and second electroactive compartments 12, 20 to inhibit diffusion of the second electroactive component from the second electroactive compartment 20 to the first electroactive compartment 12. The ion selective material 30 can be adapted to inhibit diffusion of the second electroactive component from the second electroactive compartment 20 to the first electroactive compartment 12, while allowing little or no electron conductivity through the ion selective material 30 and between the first and second electroactive compartments 12, 20. In one aspect, the ion selective material 30 can be disposed over the electroactive film 14 such that the ion selective material 30 acts as a separator between the electroactive film 14 and the second electroactive component of the electroactive solution or gel 24.

A primary seal 60 traverses an approximate perimeter of, and is configured to cooperate with, the first and second substrates 40, 50 to define a chamber 62 that may optionally be substantially hermetically sealed. The primary seal 60 may be applied to the first and/or second substrates 40, 50 by conventional methods, such as by silk-screening or dispensing. In one example, the primary seal 60 may incorporate at least first and second seal components to form the primary seal 60. Optionally, one or more spacers (not shown), e.g., glass or polymeric beads, can be provided between the first and second substrates 40, 50 to facilitate maintaining a predetermined spacing distance between the first and second substrates 40, 50.

The electro-optic element 10 can be incorporated into any suitable optical device, non-limiting examples of which include interior and exterior mirrors, architectural windows, vehicle windows, sunroofs, aircraft windows, camera filters, and eyewear, as well as other optical assemblies positioned within bezels and housings. The electro-optic element 10 according to the aspects of the present disclosure can include additional or fewer components arranged in a different manner without deviating from the scope of the present disclosure based on the intended application of the electro-optic element 10, non-limiting examples of which include polarizers, reflective elements, and transflective elements.

The electro-optic element 10 is operable between a substantially clear state and a substantially dark or darkened state, as well as intermediate states thereto. The darkened state of the electro-optic element 10 is defined relative to the transmissivity of the substantially clear state. According to one aspect of the present disclosure, transmissivity of the electro-optic element 10 in the substantially clear state may be greater than about 25%, greater than about 50%, greater than about 60%, greater than about 70%, or greater than about 85%. The percentage of reflectance, transmittance, and absorbance of the electro-optic element 10 sum to 100%. In one aspect, the transmissivity of the electro-optic element 10 in the substantially darkened state may be less than about 10%, less than about 1%, less than about 0.1%, or less than about 0.01%.

The first and second substrates 40, 50 can be made from the same or different material. The material of the first and second substrates 40, 50 can vary based on the intended application of the electro-optic element 10 and can be selected from materials such as glass, polymeric materials, ceramics, and other optically transparent or translucent material. In some aspects, both the first and second substrates 40, 50 are optically transparent or translucent, while in other aspects, only the first substrate 40 is optically transparent or translucent and the second substrate 50 is opaque or reflective. A thickness of each of the first and second substrates 40, 50 may vary depending on the end use application of the electro-optic element 10. In one example, the first and second substrates 40, 50 can have a thickness of less than about 1.2 mm, less than about 0.8 mm, or less than about 0.6 mm.

The first and second electrically conductive layers 16, 26 can be made from the same or different material. At least the first electrically conductive layer 16 is made from a transparent, electrically conductive material, and optionally both the first and second electrically conductive layers 16, 26 are made from a transparent, electrically conductive material. In some examples, the second electrically conductive layer 26 is made from a non-transparent, electrically conductive material. The electrically conductive layers 16, 26 may be transparent, opaque, or reflective depending upon the intended use of the electro-optic element 10. For example, where the electro-optic element 10 is to be incorporated into a window, both electrically conductive layers 16, 26 should be substantially transparent, and where the electro-optic element 10 is to be incorporated into a mirror, at least one of the electrically conductive layers 16, 26 is transparent.

Non-limiting examples of transparent electrically conductive materials include: fluorine doped tin oxide (FTO), indium doped tin oxide (ITO), doped zinc oxide, indium zinc oxide, metal oxide/Ag/metal oxide, silver nano-wire coatings, carbon nanotube coatings, graphene coatings, wire grids, and conductive polymers such as, but not limited to, poly(3,4-ethylenedioxythiophene) (PEDOT). Non-limiting examples of non-transparent electrically conductive coatings include metal coatings such as rhodium, chromium, nickel, silver, gold, and other metals, or mixtures of any two or more thereof. Optionally, one or both of the first and second electrically conductive layers 16, 26 can include additional layers or sub-layers. For example, the second electrically conductive layer 26 may include a metal reflector or one or more coatings configured as a partially reflective, partially transmissive ("transflective") coating.

The first electroactive compartment 12 includes an electroactive film 14 which may be a cathodic film or an anodic film and the second electroactive compartment 20 includes an electroactive solution or gel 24 which may be a cathodic solution or gel or an anodic solution or gel. When the electroactive film 14 is a cathodic film, the first electroactive component is a cathodic component and the second electroactive compartment 20 includes an anodic solution or gel 24 in which the second electroactive component is an anodic component. In this configuration, the first electroactive compartment 12 can be referred to as a cathodic compartment and the second electroactive compartment 20 can be referred to as an anodic compartment. When the electroactive film 14 is an anodic film, the first electroactive component is an anodic component and the second electroactive compartment 20 includes a cathodic solution or gel 24 in which the second electroactive component is a cathodic component. In this configuration, the first electroactive compartment 12 can be referred to as an anodic compartment and the second electroactive compartment 20 can be referred to as a cathodic compartment.

The cathodic component can be selected based on its suitability for use in either the electroactive film 14 or the electroactive solution or gel 24, based on the configuration of the electro-optic element 10. Non-limiting examples of cathodic components according to the present disclosure include a viologen, a viologen derivative, a methyl viologen, an octyl viologen, a benzyl viologen, a di-acrylate viologen, a di-vinyl viologen, a di-vinyl ether viologen, a di-epoxy viologen, a di-oxetane viologen, a di-hydroxy viologen, 1,1'-dialkyl-2,2'-bipyridinium, ferrocenium, substituted ferrocenium, a diimide, N,N'-dialkyl pyrometallic diimide, N,N'-dimethyl-1,4,5,8-naphthalene diimide, and combinations thereof. Exemplary viologen derivatives are described in U.S. Pat. Nos. 4,902,108; 6,188,505; 5,998,617; 9,964,828; and 6,710,906, the contents of which are all herein incorporated by reference in their entirety. In one aspect, when the electroactive film 14 is a cathodic film, the cathodic component can include a polymer film, such as poly(3,4-ethylenedioxythiophene) or a polymeric metallocene, for example. In another aspect, when the electroactive film 14 is a cathodic film, the cathodic component can include a solid transition metal oxide, a non-limiting example of which includes oxides of tungsten.

The anodic component can be selected based on its suitability for use in either the electroactive film 14 or the electroactive solution or gel 24, based on the configuration of the electro-optic element 10. Non-limiting examples of anodic components include metallocenes, 5,10-dihydrophenazines, phenothiazines, phenoxazines, carbazoles, triphendioxazines, triphenodithiazines, ferrocene, substituted ferrocenes, substituted ferrocenyl salts, phenazine, substituted phenazines, substituted phenothiazines, substituted dithiazines, thianthrene, substituted thianthrenes, di-tert-butyl-diethylferrocene, 5,10-dimethyl-5,10-dihydrophenazine (DMP), bis(triethylaminopropyl)dihydrophenazine, 3,7,10-trimethylphenothiazine, 2,3,7,8-tetramethoxy-thianthrene, 10-methylphenothiazine, tetramethylphenazine (TMP), 5,10-bis(hydroxyalkyl) 5,10-dihydrophenazine, 5,10-bis[4-(3-hydroxypropyl dimethylammonio)butyl] 5,10-dihydrophenazine, bis(butyltriethylammonium)-para-methoxytriphenodithiazine (TPDT), and combinations thereof. When the electroactive film 14 is an anodic film, the anodic component can include a polymer film, such as a polyaniline film or a polythiophene film, a polymeric metallocene, or a solid transition metal oxide, including, but not limited to, oxides of vanadium, nickel, tungsten, and iridium, as well as numerous heterocyclic compounds, etc. It will be understood that numerous other anodic materials are contemplated for use including those disclosed in U.S. Pat. Nos. 4,902,108; 6,188,505; 6,710,906; 9,964,828; and 7,428,091, the contents of which are all herein incorporated by reference in their entirety.

The electroactive film 14 can include a first electroactive component, either a cathodic component or an anodic component, which is incorporated into a polymeric matrix to form a film. The first electroactive component can be incorporated into a backbone of the polymeric chains of the polymeric matrix forming the electroactive film 14 and/or covalently bonded to the polymeric chains as pendant groups. For example, the electroactive film 14 may include a polymeric film including a plurality of polymeric chains composed of a number of repeating monomer units forming a backbone of the polymer chains. The first electroactive component may form pendant groups covalently attached to the backbone of the polymeric chains or may be disposed between monomer units of the backbone of the polymer chains. The electroactive film 14 optionally may include a binder polymer (e.g., polymethylmethacrylate (PMMA), polyvinyl formal, or polyethylene glycol), a plasticizer that will help facilitate ion conductivity (e.g., propylene carbonate or gamma-butyrolactone), and/or a supporting electrolyte (e.g., tetraethylammonium tetrafluoroborate or lithium hexafluorophosphate).

Optionally, the polymer chains forming the electroactive film 14 may be cross-linked. Cross-linking the polymer chains of the electroactive film 14 may increase mechanical stability of the electroactive film 14. The polymeric matrix may optionally include additional polymeric chains which do not include the first electroactive component. These additional polymeric chains may be formed from the same or different monomer units as the polymeric chains incorporating the first electroactive component and may optionally be cross-linked with the polymeric chains incorporating the first electroactive component. Non-limiting examples of materials that may be used with the polymeric matrix for covalently bonding the first electroactive component with the polymeric matrix to form the electroactive film 14 include: polyacrylate, polymethacrylates, polypropylene methacrylates, polyethers, polyesters, polycarbonates, polyurethanes, polysiloxanes, polysilanes, polyacrylonitriles, polystyrenes, polymethacrylonitriles, polyamides, polyimides, polyvinylidene halides, and co-polymers, or combinations of any two or more thereof. Further examples of polymer matrix materials used in electro-optic elements can be found in U.S. Pat. Nos. 6,635,194; 5,940,201; 5,928,572; and 9,964,828, each of which are herein incorporated by reference in their entirety.

According to an aspect of the disclosure, the first electroactive component (either a cathodic component or an anodic component) can include at least one polymerizable functional group that can be reacted with a polymer or polymer monomers that form the polymeric matrix of the electroactive film 14. In one aspect, the first electroactive component is incorporated into a compound that includes one or more polymerizable functional groups that are capable of reacting with a polymer or polymer monomers that form the polymeric matrix. In this manner, the electroactive component, either a cathodic component or an anodic component, may be covalently bonded to the polymeric matrix forming the electroactive film 14 by one or more linkages.

For example, the first electroactive component can include a hydroxyl group, such that the component may be covalently bonded to the polymeric matrix via a condensation reaction or react with an isocyanate functionality to form a polyurethane-based polymeric matrix. Amines may also react with isocyanate functionalities to form urea and biuret linkages. It is also within the scope of the present disclosure to utilize other polymeric matrix systems that include the first electroactive component that can be formed using a multi-functional epoxy in combination with a curing agent like an amine, alcohol, or anhydride or through base or acid catalyzed homo- or co-polymerization.

According to an aspect of the present disclosure, the electroactive film 14 can be prepared utilizing any suitable method for providing a film having the desired thickness and uniformity. For example, the electroactive film 14 can be prepared using a Mayer or other rod coating process or a doctor blade draw-down process or applied as a spray coating or applied by screen printing.

The electroactive solution or gel 24 includes the second electroactive component, either a cathodic component or an anodic component, depending on the configuration of the electro-optic element 10, in either a solution phase or a gel phase. When the second electroactive component is a cathodic component, the electroactive solution or gel 24 can be referred to as a cathodic solution or a cathodic gel. When the second electroactive component is an anodic component, the electroactive solution or gel 24 can be referred to as an anodic solution or an anodic gel. The electroactive solution or gel 24 can include both a cathodic component and an anodic component without deviating from the scope of the present disclosure.

When the electroactive solution or gel 24 is an electroactive solution, the second electroactive component can be dissolved within a solvent system including at least one solvent. The solvent system can be selected based at least in part on the solubility of the second electroactive component, either a cathodic component or an anodic component, in the solvent system. Non-limiting examples of solvents suitable for use in the solvent system include: dimethyl carbonate, ethyl methyl carbonate, water, acetonitrile, N,N-dimethylformamide, dimethylsulfoxide, methyl ethyl ketone, cyclopentanone, propanesultone, and cyclic esters, including propylene carbonate, ethylene carbonate, β-propiolactone, β-butyrolactone, gamma-butyrolactone, gamma-valerolactone delta-valerolactone, and mixtures thereof. Exemplary electroactive solutions can be found in U.S. Pat. No. 4,902,108, issued Feb. 20, 1990, the contents of which are incorporated by reference herein in their entirety.

Optionally, the electroactive solution 24 can include a thickening or gelling material to increase the viscosity of the electroactive solution 24. The thickening or gelling material can be selected to increase the viscosity of the electroactive solution 24 without reacting to form covalent bonds with the second electroactive component. The type and amount of thickening or gelling material can be selected based on the second electroactive component and a desired viscosity of the electroactive solution 24. In some examples, a thickening or gelling material may be added to form an electroactive gel 24 or may be added to increase the viscosity of the electroactive solution 24 without forming a true gel.

When the electroactive solution or gel 24 is an electroactive gel, the second electroactive component, either a cathodic component or an anodic component, can be sequestered within a polymeric matrix, but not covalently bonded to the polymeric matrix. The electroactive gel 24 can be a gel that includes a solvent system, the second electroactive component, and a polymeric matrix. The solvent system used in forming the electroactive gel 24 can be the same or different than that described above for the electroactive solution 24. Non-limiting examples of suitable polymeric matrices for sequestering the second electroactive component in the electroactive gel 24 include: polyacrylate, polymethacrylates, polyethers, polyesters, polycarbonates and polyurethanes, polysiloxanes, polysilanes, polyacrylonitriles, polystyrenes, polymethacrylonitriles, polyamides, polyimides, polyvinylidene halides, and co-polymers or combinations of any two or more thereof. Optionally, polymeric matrix forming the electroactive gel 24 may be cross-linked. Additional examples of polymeric matrix materials can be found in U.S. Pat. Nos. 6,635,194 and 5,940,201, the contents of which are both herein incorporated by reference in their entirety.

The electroactive solution or gel 24 can include one or more ionic current carrying electrolytes, non-limiting examples of which include alkali metal salts, tetraalkylammonium salts, and halide salts, such as aluminum chloride or aluminum bromide, metal or ammonium salts, such as $Li^+$, $Na^+$, $K^+$, $NR'_4{}^+$ (where each R' is individually H, alkyl, or cycloalkyl), of the following anions $F^-$, $Cl^-$, $Br^-$, $I^-$, $BF_4{}^-$, $PF_6{}^-$, $SbF_6{}^-$, $AsF_6{}^-$, $ClO_4{}^-$, $SO_3CF_3{}^-$, $-N(CF_3SO_2)_2{}^-$, $C(CF_3SO_2)_3{}^-$, $N(SO_2C_2F_5)^-$, $Al(OC(CF_3)_3)_4{}^-$, or $BAr_4{}^-$, wherein Ar is an aryl or fluorinated aryl group such as, but not limited to, $C_6H_5$, $3,5\text{-}(CF_3)_2C_6H_3$, or $C_6F_5$. Examples of cationic electrolytes include $Li^+$, $Na^+$, tetraalkylammonium, and tetra-n-butylammonium. Examples of anionic electrolytes include $N(CF_3SO_2)_2{}^-$, $PF_6{}^-$, $BF_4{}^-$, and $ClO_4{}^-$. In some cases, the electrolyte may be introduced to either the first and/or second electroactive compartments 12, 20 as the counter-ion on the electroactive component. For example, n-octyl viologen bis(tetrafluoroborate), a cathodic component, contains two equivalents of electrolyte $BF_4{}^-$ per equivalent of n-octyl viologen bis(tetrafluoroborate). In another example, 10-bis[4-(3-hydroxypropyl dimethylammonio)butyl] 5,10-dihydrophenazine bis(hexafluorophosphate), an anodic component, contains two equivalents of electrolyte $PF_6{}^-$ per equivalent of 5,10-bis[4-(3-hydroxypropyl dimethylammonio)butyl] 5,10-dihydrophenazine bis(hexafluorophosphate).

The ion selective material 30 is selected based at least in part on the first and second electroactive components to inhibit the diffusion or passage of ions (also referred to as electrolytes) of a first charge between the first and second electroactive compartments 12, 20, while allowing ions of a second charge, different than the first charge, to pass or diffuse through the ion selective material 30. According to an aspect of the present disclosure, the ion selective material 30 can be selected to inhibit diffusion or passage of ions having a charge corresponding to the charge of the electroactive component in the electroactive solution or gel 24 in the activated state. For example, when the electroactive component in the electroactive solution or gel 24 has a positive charge in the activated state, the ion selective material 30 is selected to inhibit the diffusion of cations between the first and second electroactive compartments 12, 20. When the electroactive component in the electroactive solution or gel 24 has a negative charge in the activated state, the ion selective material 30 is selected to inhibit the diffusion of anions between the first and second electroactive compartments 12, 20.

For example, when the electroactive film 14 is an anodic film and the electroactive solution or gel 24 is a cathodic solution or gel in which the electroactive components are cations in the activated state, the ion selective material 30 can be selected to inhibit the diffusion of cations (i.e., ions of a first, positive charge) between the first and second electroactive compartments 12, 20 and allow the diffusion of anions (i.e., ions of a second, negative charge) between the first and second electroactive compartments 12, 20. In this example, the electroactive component of the electroactive solution or gel 23 could be, but is not limited to a viologen, which is a cation in the activated, one electron reduced state. In another example, when the electroactive film 14 is a cathodic film and the electroactive solution or gel 24 is an anodic solution or gel in which the electroactive components are cations in the activated state, the ion selective material 30 can be selected to inhibit the diffusion of cations (i.e., ions of a first, positive charge) between the first and second electroactive compartments 12, 20 and allow the diffusion of anions (i.e., ions of a second, negative charge) between the first and second electroactive compartments 12, 20. In this example, the electroactive component of the electroactive solution or gel 24 could be, but is not limited to 5,10-dimethyl-5,10-dihydrophenazine (DMP), which is a cation in the activated, oxidized state. In another example, when the electroactive film 14 is an anodic film and the electroactive solution or gel 24 is a cathodic solution or gel in which the electroactive components are anions in the activated state, the ion selective material 30 is selected to inhibit the diffusion of anions (e.g., ions of a first, negative charge) between the first and second electroactive compartments 12, 20 and allow the diffusion of cations (i.e., ions of a second positive charge) between the first and second electroactive compartments 12, 20. In this example, the electroactive component of the electroactive solution or gel 24 could be, but is not limited to, N'N'-dimethyl-1,4,5,8-naphthalene diimide, which is anionic in the activated, reduced state. Thus, in one example, the first electroactive component can be an anodic component, the second electroactive component can be a cathodic component, and the ion selective material can be an anionic exchange material. In another example, the first electroactive component can be a cathodic component, the second electroactive component can be an anodic component, and the ion selective material can be an anionic exchange material. In another example, the first electroactive component can be an anodic component, the second electroactive component can be a cathodic component, and the ion selective material can be a cationic exchange material.

In this manner, when the electro-optic element 10 is in the activated, darkened state, diffusion of ions of a first charge is inhibited while diffusion of ions of a second charge is allowed. Thus, when the electro-optic element 10 is in the activated, darkened state, the second electroactive component is inhibited from diffusing from the second electroactive compartment 20, through the ion selective material 30, and into the first electroactive compartment 12, while allowing little or no electron conductivity through the ion selective material 30 and between the first and second electroactive compartments 12, 20. Inhibiting diffusion of the second electroactive component can facilitate inhibiting interaction of the second electroactive component with the first electroactive component, which can result in self-erasing of the electro-optic element 10. The first electroactive component is incorporated into the electroactive film 14, which inhibits movement of the first electroactive component. Inhibiting interaction of the first and second electroactive components can allow the electro-optic element 10 to maintain the darkened state for a predetermined period of time when placed in an open circuit, i.e., the electro-optic element 10 can demonstrate memory for a predetermined period of time.

The ion selective material 30 can be any suitable transparent material configured to inhibit diffusion of ions having a first charge and allow diffusion of ions having a second charge, based on the configuration of the first and second electroactive compartments 12, 20. According to some aspects, an ion exchange membrane is an example of an ion selective material 30. The ion selective materials or ion exchange membrane materials suitable for use with aspects of the present disclosure are generally composed of immobilized ions of one charge bound to a polymer backbone or pendant groups and mobile charge or non-covalently bound counter ions of the opposite charge. For example, an anionic exchange membrane can be a material that has polymer-bound cations and non-covalently bound anions. In another example, a cationic exchange membrane can be a material that has polymer-bound anions and non-covalently bound cations. Non-limiting examples of suitable polymer materials that could be used in an ion selective material 30 include, but are not limited to, derivatized polysulfones, derivatized poly(ether sulfones), derivatized poly(ether ketones), derivatized benzimidazoles, derivatized poly(phenylene oxides), derivatized polypropylenes, derivatized polyethylene, derivatized polyacrylates, derivatized polymethacrylates, derivatized polyamides, derivatized polystyrenes, derivatized polyethers, derivatized poly(ethylene oxide), derivatized poly(arylene ethers), derivatized poly(tetrahydrofuran), sulfonated tetrafluoroethylene polymers, ammoniated polystyrene copolymers, poly(vinyl pyridinium) co-polymers, poly(vinyl imidazolium) co-polymers, and combinations thereof. Copolymer combinations can include, but are not limited to, block copolymer, alternating copolymers, random copolymers, and graft copolymers. Exemplary ion selective materials 30 are described in U.S. Pub. No. 2019/0048159, published Feb. 14, 2019, the contents of which is herein incorporated by reference in its entirety.

FIG. 2 illustrates a method 100 of forming an electro-optic element according to an aspect of the present disclosure. While the method 100 is described in the context of forming the electro-optic element 10 of FIG. 1, it is understood that the method 100 can be used to form other electro-optic elements according to the aspects of the present disclosure. It is understood that the method 100 can include additional or fewer steps, unless stated otherwise, or be combined with other methods for forming electro-optic elements, devices, and assemblies without deviating from the scope of the present disclosure.

The method 100 can include providing the first electroactive compartment 12 at 102. Providing the first electroactive compartment 12 can include providing the electroactive film 14 disposed on the first electrically conductive layer 16, which is disposed on the first substrate 40. The electroactive film 14 and/or first electrically conductive layer 16 can be disposed on the first substrate 40 and stored for a predetermined period of time until use or formed immediately prior to providing the ion selective material 30 at step 104. For example, the first electrically conductive layer 16, as well as any additional layers or coatings, can be formed on the first substrate 40 and stored as a pre-form until the electroactive film 14 is deposited or formed on the first electrically conductive layer 16, prior to providing the ion selective material 30 over the electroactive film 14 at step 104. In another example, the pre-form can include the first substrate 40, the first electrically conductive layer 16, and the electroactive film 14.

After forming the first electroactive compartment 12, the ion selective material 30 can be provided at 104 by disposing the ion selective material 30 on at least the electroactive film 14. According to one aspect, the ion selective material 30 is provided on the electroactive film 14 such that any exposed surface of the electroactive film 14 is covered by the ion selective material 30. In another example, only those surfaces of the electroactive film 14 that will ultimately be disposed within the first compartment 12 can be covered by the ion selective material 30. In some aspects of the present disclosure, the first electroactive compartment 12 can optionally include additional elements and/or films in combination with the electroactive film 14.

At 106, the second electroactive compartment 20 can be formed by assembling the second substrate 50 with the first substrate 40 such that the second electrically conductive layer 26 is facing the first electrically conductive layer 16. One or more seals can be provided to form the primary seal 60 around a perimeter of the electro-optic element 10 and couple the first and second substrates 40, 50, thereby forming the chamber 62. Optional spacers, such as glass beads, can be provided to facilitate maintaining a desired spacing between the first and second substrates 40, 50. Once the chamber 62 is formed, the electroactive solution or gel 24 including the second electroactive component can be provided into the chamber 62 through a suitable filling port or gap in the primary seal 60 at step 106. In one example, the electroactive solution or gel 24 can be provided into the chamber 62 under vacuum. The filling port or gap can be sealed after the electroactive solution or gel 24 has been provided to the chamber 62. In another example, the electroactive solution or gel 23 can be formed on the second electrically conductive layer 26, which is disposed on the first substrate, and then laminated to the ion selective material 30.

The second electroactive component can be provided to the chamber 62 in a composition in either a solution phase or gel phase. Preferably, the second electroactive component is provided in a form having sufficient flowability to flow into the chamber 62. The composition including the second electroactive component can optionally include additional components, as described above, examples of which including thickening materials, gelling materials, solvents, electrolytes, etc. In one example, the second electroactive component can be provided in an electroactive solution 24 which is configured to remain in the solution phase during normal use conditions of the electro-optic element 10. In another example, the second electroactive component can be provided to the chamber 62 as a pre-gel solution which, upon curing, forms an electroactive gel 24 in the second electroactive compartment 20. Curing of the electroactive gel 24 can include allowing the electroactive gel 24 to rest for a predetermined period of time, the application of heat, the application of radiation (e.g., ultraviolet light), and/or exposure to a cross-linking material. In one example, the second electroactive component can be provided to the chamber 62 as a partially cured electroactive gel 24 and curing can be completed once the electroactive gel 24 is disposed within the chamber 62.

Without being limited by any theory, conventional solution-phase electro-optic elements typically contain at least one anodic (oxidizable) material, at least one cathodic (reducible) material, and a solvent. An electric potential can be applied to the conventional solution-phase electro-optic element to cause the element to transition between transparent and darkened states. Internal diffusion processes can result in the activated cathodic and anodic materials undergoing additional charge transfer processes that can result in continual self-erasing, and thus require the continual application of an electric potential to maintain the electro-optic element in the darkened state. Aspects of the present disclosure relate to inhibiting movement of the cathodic or anodic components by incorporating one of the cathodic and anodic components in a polymeric matrix and by inhibiting movement of the other of the cathodic or anodic component through the use of an ion selective material. Inhibiting movement of the cathodic and anodic components can decrease the occurrence of the additional charge transfer processes that can result in self-erasing, thus allowing the electro-optic element to have memory, a lower power consumption, and to remain in the darkened state for a predetermined period of time, in an open circuit.

Incorporating one of the cathodic or anodic component in a polymeric matrix inhibits movement of the incorporated component, thus minimizing the ability of the incorporated component to participate in reactions that may result in self-erasing. Incorporating the first electroactive component in a polymeric film can be considered as confining the first electroactive component within a predetermined region of the electro-optic element. Providing the second electroactive component in a solution or gel phase, allows the second electroactive component to be backfilled into the chamber under controlled conditions (e.g., under vacuum, under low oxygen atmosphere). Some materials may be sensitive to environmental conditions, such as moisture and oxygen, and thus it may be desirable to assemble the electro-optic element under controlled conditions that limit exposure of the electro-optic element materials to these environment conditions. The ability to provide the second electroactive component as a liquid or gel into a fully or partially assembled electro-optic element can facilitate controlling the exposure of the components of the electro-optic element. For example, it may be easier to protect materials from oxygen by backfilling an electro-optic element under vacuum with a solution or gel phase electroactive component compared to trying to assemble an electroactive component incorporated into a film provided on a substrate.

Because the second electroactive component is provided in a liquid or gel phase, the second electroactive component is capable of diffusion within the second electroactive compartment. The ion selective material is configured to inhibit movement of the second electroactive component into the first electroactive compartment and thereby inhibit interaction of the first and second electroactive components. Because the first electroactive component is already confined within the polymeric matrix of the electroactive film, the ion selective material need only inhibit movement of the second electroactive component. In this manner the hybrid electro-optic element of the present disclosure can be tailored to utilize certain advantages of incorporating an electroactive component in a polymeric matrix and certain advantages of a solution or gel phase electroactive component, based on the particular materials used and the desired characteristics of the thus formed electro-optic element.

The following examples describe various features and advantages provided by aspects of the present disclosure, and are in no way intended to limit the present disclosure and the appended claims.

EXAMPLES

An exemplary electro-optic element according to the present disclosure was formed and incorporated into an electrochromic device as described below. The electro-optic element stack profile was as follows, in order: glass substrate/ITO film/anodic film/anionic ionic exchange member/cathodic gel/ITO film/glass substrate.

Figure 3:
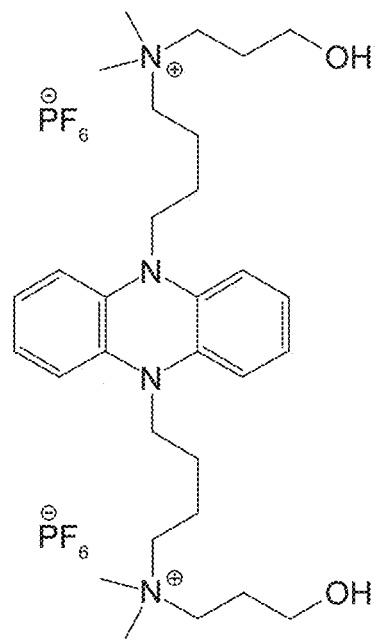
FIG. 3 illustrates a chemical structure of a compound for forming an anodic film according to an aspect of the present disclosure.
Figure 4:
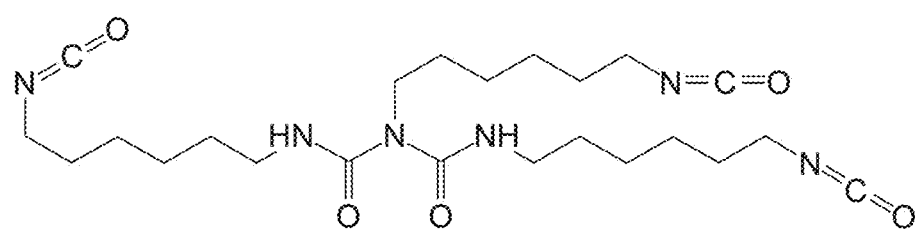
FIG. 4 illustrates a chemical structure of a compound used in combination with the compound of FIG. 3 to form an anodic film according to an aspect of the present disclosure.

A cross-linked anodic film was prepared by combining the phenazine compound of FIG. 3,5,10-bis[4-(3-hydroxypropyl dimethylammonio)butyl] 5,10-dihydrophenazine bis (hexafluorophosphate), with the isocyanate cross-linker ("HDT") of FIG. 4. The HDT compound of FIG. 4 is a trimer of hexamethylene diisocyanate (with other oligomers) in the "biuret" form. The final hydroxy to isocyanate ratio in the anodic film composition was about 1.1 to 1. The anodic film composition also contained 50 ppm of a tin catalyst, dibutyltin diacetate, to promote curing, and aprotic coating solvents, including propylene carbonate and 3-methoxypropionitrile. The anodic film composition was coated on a first indium tin oxide (ITO) layer (½-wave) coated on a 3 inch by 3 inch soda-lime glass substrate (2.2 mm thickness) with a Mayer rod. The first ITO layer acts as the anode in the electro-optic element. The anodic film composition was cured by placing the freshly coated glass substrate in a 60° C. oven under a nitrogen gas atmosphere overnight to form the cross-linked anodic phenazine-based film. The thickness of the cured, cross-linked anodic phenazine-based film was about 1.5 micrometers to about 2.5 micrometers.

Next, a 2.5×2.5 inch square of an anionic ionic exchange membrane, Fumasep FAPQ-375-PP, commercially available from Fumatech in Bietigheim-Bissingen Germany, was laminated over the cross-linked anodic phenazine-based film by placing the membrane over the anodic film in a vacuum bag, then evacuating and sealing bag, and heating to 100° C.

for an hour to laminate the anionic ionic exchange membrane over the cross-linked anodic phenazine-based film.

A second piece of ½-wave ITO coated glass substrate is place adjacent to the laminated anionic ionic exchange membrane, with the second ITO layer facing the anionic ionic exchange membrane. The second ITO layer acts as the cathode in the electro-optic element. The two glass substrates are adhered to one another by placing a thermoset epoxy seal around a perimeter of the device. The thermoset epoxy included 220 micrometer glass beads to provide a gap of about 150 micrometers between the second ITO coating and the anionic ionic exchange membrane. The thermoset epoxy seal was cured overnight.

A cathodic gel was formed by mixing 32 millimolar of N,N'-dioctylviologen bis(tetrafluoroborate), 2.8% (by weight) of a 1:10 copolymer of 2-hydroxyethylmethacrylate and methyl acrylate, 0.19% (by weight) of a diisocyanate crosslinker, Lupranate MI (commercially available from BASF), 20 millimolar tetraethylammonium tetrafluoroborate, and 1.0 part-per-million dibutyltin diacetate in a propylene carbonate solvent to form a cathodic gel composition. The cathodic gel composition was then vacuum backfilled between the anionic ionic exchange membrane and the second ITO layer through a gap in the thermoset epoxy and a UV-cured epoxy material was used to fill the backfill gap. The cathodic gel composition was then allowed to gel overnight to form the cathodic gel.

To demonstrate the ability of the electrochromic device to exhibit memory, i.e., to remain in the darkened state without continuous application of an electrical potential, an electrical connection was placed between the two ITO layers. First, a 0.8 volt potential was applied, with the anodic phenazine-based film being oxidized at the ITO anode and the cathodic gel being reduced at the ITO cathode to transition the device to the colored, darkened state. The anionic ionic exchange membrane used in this example was white and translucent. The anodic side of the electrochromic device transitions from colorless to green and the cathodic side transitions from colorless to blue in color when the electrical potential is applied. In less than 1 minute, the device is fully darkened. When the circuit between the two ITO layers was shorted, the device transitioned back to the clear, colorless state within 1 minute. Next, the same device was placed under the same 0.8 volts of potential for 1 minute, but instead of shorting the device, the circuit between the ITO layers is placed in an open circuit. The device remained in the darkened, colored state for more than an hour without losing any colorization.

The following non-limiting aspects are encompassed by the present disclosure. To the extent not already described, any one of the features of the following first through the twentieth aspects may be combined in part or in whole with features of any one or more of the other of the first through the twentieth aspects of the present disclosure to form additional aspects, even if such a combination is not explicitly described.

According to a first aspect of the present disclosure, an electro-optic element, including: a first electroactive compartment including an electroactive film including a first electroactive component, wherein the first electroactive compartment is disposed adjacent a first electrically conductive layer; a second electroactive compartment disposed adjacent a second electrically conductive layer and including an electroactive solution or gel including a second electroactive component, and wherein the second electroactive component is changeable from an inactivated state to an activated state upon application of a predetermined electrical potential across the first and second electrically conductive layers; and an ion selective material disposed between the first and second electroactive compartments, wherein the ion selective material is configured to inhibit diffusion of the second electroactive component in the activated state from the second electroactive compartment to the first electroactive compartment, and wherein at least one of the first electroactive component and second electroactive component is electrochromic such that the electro-optic element is configured to reversibly attenuate transmittance of light having a wavelength within a predetermined wavelength range when an electrical potential is applied across the first and second electrically conductive layers.

According to a second aspect, the electro-optic element of the first aspect, wherein the first electroactive component or the second electroactive component comprises at least one cathodic component selected from a viologen, viologen derivative, methyl viologen, octyl viologen, benzyl viologen, di-acrylate viologen, di-vinyl viologen, di-vinyl ether viologen, di-epoxy viologen, di-oxetane viologen, di-hydroxy viologen, 1,1'-dialkyl-2,2'-bipyridinium, ferrocenium, substituted ferrocenium, diimide, N,N'-dialkyl pyrometallic diimide, N,N'-dimethyl-1,4,5,8-naphthalene diimide, and combinations thereof.

According to a third aspect, the electro-optic element of the first or second aspects, wherein the first electroactive component or the second electroactive component comprises at least one anodic component selected from metallocenes, 5,10-dihydrophenazines, phenothiazines, phenoxazines, carbazoles, triphendioxazines, triphenodithiazines, ferrocene, substituted ferrocenes, substituted ferrocenyl salts, phenazine, substituted phenazines, substituted phenothiazines, substituted dithiazines, thianthrene, substituted thianthrenes, di-tert-butyl-diethylferrocene, 5,10-dimethyl-5,10-dihydrophenazine (DMP), bis(triethylaminopropyl)dihydrophenazine, 3,7,10-trimethylphenothiazine, 2,3,7,8-tetramethoxy-thianthrene, 10-methylphenothiazine, tetramethylphenazine (TMP), 5,10-bis(hydroxyalkyl) 5,10-dihydrophenazine, 5,10-bis[4-(3-hydroxypropyl dimethylammonio)butyl] 5,10-dihydrophenazine, bis(butyltriethylammonium)-para-methoxytriphenodithiazine (TPDT), and combinations thereof.

According to a fourth aspect, the electro-optic element of any one of the first aspect to the third aspect, wherein the ion selective material comprises at least one polymer selected from derivatized polysulfones, derivatized poly(ether sulfones), derivatized poly(ether ketones), derivatized benzimidazoles, derivatized poly(phenylene oxides), derivatized polypropylenes, derivatized polyethylene, derivatized polyacrylates, derivatized polymethacrylates, derivatized polyamides, derivatized polystyrenes, derivatized polyethers, derivatized poly(ethylene oxide), derivatized poly(arylene ethers), derivatized poly(tetrahydrofuran), sulfonated tetrafluoroethylene polymers, ammoniated polystyrene copolymers, poly(vinyl pyridinium) co-polymers, poly(vinyl imidazolium) co-polymers, and combinations thereof.

According to a fifth aspect, the electro-optic element of any one of the first aspect to the fourth aspect, wherein at least one of the first electrically conductive layer and the second electrically conductive layer comprises a material selected from fluorine doped tin oxide (FTO), indium tin oxide (ITO), doped zinc oxide, indium zinc oxide, metal oxide/Ag/metal oxide, silver nano-wire coatings, carbon nanotube coatings, graphene coatings, wire grids, conductive polymers, poly(3,4-ethylenedioxythiophene) (PEDOT), rhodium, chromium, nickel, silver, gold, and combinations thereof.

According to a sixth aspect, the electro-optic element of any one of the first aspect to the fifth aspect, wherein the first electroactive component is at least one of incorporated into a backbone of a polymeric matrix and covalently bonded to a polymer chain forming a polymeric matrix as a pendant group.

According to a seventh aspect, the electro-optic element of any one of the first aspect to the fifth aspect, wherein the electroactive film comprises at least one material selected from a polyaniline, polythiophene, polymeric metallocene, nickel oxide, vanadium oxide, tungsten oxide, and iridium oxide.

According to an eighth aspect, the electro-optic element of any one of the first aspect to the seventh aspect, wherein: the first electroactive component comprises an anodic component; the second electroactive component includes a cathodic component; and the ion selective material is an anionic ionic exchange material.

According to a ninth aspect, the electro-optic element of any one of the first aspect to the seventh aspect, wherein: the first electroactive component comprise a cathodic component; the second electroactive component includes an anodic component; and the ion selective material is an anionic ionic exchange material.

According to a tenth aspect, the electro-optic element of any one of the first aspect to the seventh aspect, wherein: the first electroactive component comprise an anodic component; the second electroactive component includes a cathodic component; and the ion selective material is a cationic ionic exchange material.

According to an eleventh aspect of the present disclosure, a method of forming an electro-optic element includes: providing a first electroactive compartment including an electroactive film including a first electroactive component disposed adjacent a first electrically conductive layer, wherein the first electrically conductive layer is disposed on a first substrate; providing an ion selective material disposed on the electroactive film; coupling a second substrate with the first substrate to form a chamber therebetween, wherein the second substrate includes a second electrically conductive layer, and wherein the first and second electrically conductive layers are disposed at least partially within the chamber; and providing an electroactive solution or gel within the chamber to form a second electroactive compartment, wherein the electroactive solution or gel includes a second electroactive component, and wherein the second electroactive component is changeable from an inactivated state to an activated state upon application of a predetermined electrical potential across the first and second electrically conductive layers, wherein the ion selective material is configured to inhibit diffusion of the second electroactive component in the activated state from the second electroactive compartment to the first electroactive compartment, and wherein at least one of the first electroactive component and second electroactive component is electrochromic such that the electro-optic element is configured to reversibly attenuate transmittance of light having a wavelength within a predetermined wavelength range when an electrical potential is applied across the first and second electrically conductive layers.

According to a twelfth aspect, the method of the eleventh aspect, wherein the coupling a second substrate with the first substrate includes forming a seal around a perimeter of the electro-optic element between the first and second substrates.

According to a thirteenth aspect, the method of the eleventh aspect or the twelfth aspect, wherein the providing an electroactive solution or gel within the chamber includes vacuum filling the chamber with a composition including the second electroactive component.

According to a fourteenth aspect, the method of the thirteenth aspect, wherein the composition including the second electroactive component is configured to form a gel.

According to a fifteenth aspect, the method of any one of the eleventh aspect to the fourteenth aspect, wherein the first electroactive component or the second electroactive component comprises at least one cathodic component selected from a viologen, viologen derivative, methyl viologen, octyl viologen, benzyl viologen, di-acrylate viologen, di-vinyl viologen, di-vinyl ether viologen, di-epoxy viologen, di-oxetane viologen, di-hydroxy viologen, 1,1'-dialkyl-2,2'-bipyridinium, ferrocenium, substituted ferrocenium, diimide, N,N'-dialkyl pyrometallic diimide, N,N'-dimethyl-1,4,5,8-naphthalene diimide, and combinations thereof.

According to a sixteenth aspect, the method of any one of the eleventh aspect to the fourteenth aspect, wherein the first electroactive component or the second electroactive component comprises at least one anodic component selected from metallocenes, 5,10-dihydrophenazines, phenothiazines, phenoxazines, carbazoles, triphendioxazines, triphenodithiazines, ferrocene, substituted ferrocenes, substituted ferrocenyl salts, phenazine, substituted phenazines, substituted phenothiazines, substituted dithiazines, thianthrene, substituted thianthrenes, di-tert-butyl-diethylferrocene, 5,10-dimethyl-5,10-dihydrophenazine (DMP), bis(triethylaminopropyl)dihydrophenazine, 3,7,10-trimethylphenothiazine, 2,3,7,8-tetramethoxy-thianthrene, 10-methylphenothiazine, tetramethylphenazine (TMP), 5,10-bis(hydroxyalkyl) 5,10-dihydrophenazine, 5,10-bis[4-(3-hydroxypropyl dimethylammonio)butyl] 5,10-dihydrophenazine, bis(butyltriethylammonium)-para-methoxytriphenodithiazine (TPDT), and combinations thereof.

According to a seventeenth aspect, the method of any one of the eleventh aspect to the sixteenth aspect, wherein the ion selective material comprises at least one polymer selected from derivatized polysulfones, derivatized poly(ether sulfones), derivatized poly(ether ketones), derivatized benzimidazoles, derivatized poly(phenylene oxides), derivatized polypropylenes, derivatized polyethylene, derivatized polyacrylates, derivatized polymethacrylates, derivatized polyamides, derivatized polystyrenes, derivatized polyethers, derivatized poly(ethylene oxide), derivatized poly(arylene ethers), derivatized poly(tetrahydrofuran), sulfonated tetrafluoroethylene polymers, ammoniated polystyrene copolymers, poly(vinyl pyridinium) co-polymers, poly(vinyl imidazolium) co-polymers, and combinations thereof.

According to an eighteenth aspect, the method of any one of the eleventh aspect to the seventeenth aspect, wherein at least one of the first electrically conductive layer and second electrically conductive layer comprises a material selected from fluorine doped tin oxide (FTO), indium tin oxide (ITO), doped zinc oxide, indium zinc oxide, metal oxide/Ag/metal oxide, silver nano-wire coatings, carbon nanotube coatings, graphene coatings, wire grids, conductive polymers, poly(3,4-ethylenedioxythiophene) (PEDOT), rhodium, chromium, nickel, silver, gold, and combinations thereof.

According to a nineteenth aspect, the method of any one of the eleventh aspect to the eighteenth aspect, wherein the first electroactive component is at least one of incorporated into a backbone of a polymeric matrix and covalently bonded to a polymer chain forming a polymeric matrix as a pendant group.

According to a twentieth aspect, the method of any one of the eleventh aspect to the nineteenth aspect, wherein the electroactive film comprises a material selected from one of a polyaniline, polythiophene, polymeric metallocene, nickel oxide, vanadium oxide, tungsten oxide, and iridium oxide.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. An electro-optic element, comprising:
   a first electroactive compartment comprising an electroactive film including a first electroactive component, wherein the first electroactive compartment is disposed adjacent a first electrically conductive layer;
   a second electroactive compartment disposed adjacent a second electrically conductive layer and comprising an electroactive solution or gel including a second electroactive component, and wherein the second electroactive component is changeable from an inactivated state to an activated state upon application of a predetermined electrical potential across the first and second electrically conductive layers; and
   an ion selective material disposed between the first and second electroactive compartments, wherein the ion selective material is (i) configured to inhibit diffusion of the second electroactive component in the activated state from the second electroactive compartment to the first electroactive compartment and (ii) and an anionic ionic exchange membrane, and
   wherein at least one of the first electroactive component and second electroactive component is electrochromic such that the electro-optic element is configured to reversibly attenuate transmittance of light having a wavelength within a predetermined wavelength range when an electrical potential is applied across the first and second electrically conductive layers, and
   wherein the first electroactive component or the second electroactive component comprises 5,10-bis(hydroxyalkyl) 5,10-dihydrophenazine.

2. The electro-optic element of claim 1, wherein the first electroactive component or the second electroactive component comprises at least one cathodic component selected from a viologen, viologen derivative, methyl viologen, octyl viologen, benzyl viologen, di-acrylate viologen, di-vinyl viologen, di-vinyl ether viologen, di-epoxy viologen, di-oxetane viologen, di-hydroxy viologen, 1,1'-dialkyl-2,2'-bipyridinium, ferrocenium, substituted ferrocenium, diimide, N,N'-dialkyl pyrometallic diimide, N,N'-dimethyl-1,4,5,8-naphthalene diimide, and combinations thereof.

3. The electro-optic element of claim 1, wherein the ion selective material comprises at least one polymer selected from derivatized polysulfones, derivatized poly(ether sulfones), derivatized poly(ether ketones), derivatized benzimidazoles, derivatized poly(phenylene oxides), derivatized polypropylenes, derivatized polyethylene, derivatized polyacrylates, derivatized polymethacrylates, derivatized polyamides, derivatized polystyrenes, derivatized polyethers, derivatized poly(ethylene oxide), derivatized poly(arylene ethers), derivatized poly(tetrahydrofuran), sulfonated tetrafluoroethylene polymers, ammoniated polystyrene copolymers, poly(vinyl pyridinium) co-polymers, poly(vinyl imidazolium) co-polymers, and combinations thereof.

4. The electro-optic element of claim 1, wherein at least one of the first electrically conductive layer and the second electrically conductive layer comprises a material selected from fluorine doped tin oxide (FTO), indium tin oxide (ITO), doped zinc oxide, indium zinc oxide, metal oxide/Ag/metal oxide, silver nano-wire coatings, carbon nanotube coatings, graphene coatings, wire grids, conductive polymers, poly(3,4-ethylenedioxythiophene) (PEDOT), rhodium, chromium, nickel, silver, gold, and combinations thereof.

5. The electro-optic element of claim 1, wherein the first electroactive component is at least one of incorporated into a backbone of a polymeric matrix and covalently bonded to a polymer chain forming a polymeric matrix as a pendant group.

6. The electro-optic element of claim 1, wherein the electroactive film comprises at least one material selected from a polyaniline, polythiophene, polymeric metallocene, nickel oxide, vanadium oxide, tungsten oxide, and iridium oxide.

7. The electro-optic element of claim 1, wherein:
   the first electroactive component comprises an anodic component; and
   the second electroactive component comprises a cathodic component.

8. The electro-optic element of claim 1, wherein:
the first electroactive component comprises a cathodic component; and
the second electroactive component comprises an anodic component.

9. The electro-optic element of claim 1, wherein the electroactive film is bi-stable.

10. The electro-optic element of claim 1, wherein the ion selective material is disposed over the electroactive film such that the ion selective material acts as a separator between the electroactive film and the second electroactive component.

11. The electro-optic element of claim 1, further comprising:
a first substrate, wherein a surface of the first substrate includes the first electrically conductive layer; and
a second substrate, wherein a surface of the second substrate includes the second electrically conductive layer.

12. The electro-optic element of claim 11, wherein a thickness of the first substrate differs from a thickness of the second substrate.

13. The electro-optic element of claim 11, wherein the first substrate is constructed from a different material than the second substrate.

14. The electro-optic element of claim 11, further comprising:
a primary seal that traverses an approximate perimeter of first and second substrates to define a chamber.

15. The electro-optic element of claim 11, further comprising:
at least one of glass and polymeric beads between the first and second substrates to facilitate maintaining a predetermined spacing between the first substrate and the second substrate.

16. The electro-optic element of claim 11, wherein the first substrate is at least partially optically transparent and the second substrate is not fully transparent.

17. The electro-optic element of claim 1, wherein the anionic ion exchange membrane comprises a derivatized polypropylene.

18. The electro-optic element of claim 1, wherein the anion ion exchange membrane allows diffusion of at least one of the following anions: $BF_4^-$, $PF_6^-$, $SbF_6^-$, $AsF_6^-$, $ClO_4^-$, $SO_3CF_3^-$, $N(CF_3SO_2)_2^-$, $C(CF_3SO_2)_3^-$, $N(SO_2C_2F_5)^-$, $Al(OC(CF_3)_3)_4^-$, or $BAr_4^-$, wherein Ar is an aryl or fluorinated aryl group.

\* \* \* \* \*

UNITED STATES PATENT AND TRADEMARK OFFICE
CERTIFICATE OF CORRECTION

| | | |
|---|---|---|
| PATENT NO. | : 11,624,962 B2 | |
| APPLICATION NO. | : 17/036260 | |
| DATED | : April 11, 2023 | |
| INVENTOR(S) | : Leroy J. Kloeppner | |

It is certified that error appears in the above-identified patent and that said Letters Patent is hereby corrected as shown below:

In the Claims

Column 20, Claim 1, Line 6, delete "and" (2nd occurrence)

Signed and Sealed this
Seventh Day of November, 2023

Katherine Kelly Vidal
*Director of the United States Patent and Trademark Office*